United States Patent [19]
Hofmann et al.

[11] Patent Number: 5,674,011
[45] Date of Patent: Oct. 7, 1997

[54] WHEEL BEARING CONNECTOR AND SEAL UNIT

[75] Inventors: Heinrich Hofmann, Schweinfurt; Peter Neibling, Bad Kissingen; Vasilis Hassiotis, Niederwerrn, all of Germany

[73] Assignee: FAG Kugelfischer Georg Schafer AG, Germany

[21] Appl. No.: 455,030

[22] Filed: May 31, 1995

[30] Foreign Application Priority Data

Jul. 21, 1994 [DE] Germany .............. 44 25 732.5

[51] Int. Cl.⁶ .................................................. F16C 32/00
[52] U.S. Cl. .................................................. 384/448; 464/178
[58] Field of Search ...................... 384/544, 543, 384/448, 589, 536, 582; 464/178, 906; 301/105.1, 124.1; 403/DIG. 1; 277/2, 152

[56] References Cited

U.S. PATENT DOCUMENTS

| | | | |
|---|---|---|---|
| 4,433,877 | 2/1984 | Colanzi | 384/544 |
| 4,668,111 | 5/1987 | Kapaan | 384/544 |
| 4,715,780 | 12/1987 | Kan | 384/536 X |
| 4,968,156 | 11/1990 | Hajzler | 384/448 |
| 5,215,387 | 6/1993 | Bertetti et al. | 384/544 |
| 5,421,654 | 6/1995 | Rigaux et al. | 384/448 |
| 5,492,417 | 2/1996 | Baker et al. | 384/544 X |

FOREIGN PATENT DOCUMENTS

| | | | |
|---|---|---|---|
| 286150 | 10/1988 | European Pat. Off. | 301/105.1 |
| 521789 | 1/1993 | European Pat. Off. | 384/448 |
| 2542917 | 3/1977 | Germany . | |
| 3126192 | 1/1983 | Germany . | |
| 4134434 | 4/1993 | Germany . | |

*Primary Examiner*—Daniel P. Stodola
*Assistant Examiner*—William A. Rivera
*Attorney, Agent, or Firm*—Ostrolenk, Faber, Gerb & Soffen, LLP

[57] ABSTRACT

To permit a reliable, compact, low vibration, lightweight wheel bearing unit having a small number of components and useful for the driven wheels of a motor vehicle, there is a connecting part fastened between the bearing arrangement on the wheel flange and a joint bell at the wheel hub and the connecting part extending between them providing elastic damping by the construction thereof.

10 Claims, 1 Drawing Sheet

WHEEL BEARING CONNECTOR AND SEAL UNIT

BACKGROUND OF THE INVENTION

The invention relates to a wheel bearing unit of simple construction with a bearing arrangement and a joint bell, and particularly relates to a connection between these two elements.

DESCRIPTION OF THE RELATED ART

Wheel bearing units for motor vehicles are known, for example, from FAG Publication No. 05119DA entitled "Kraftfahrzeug-Radlagerungen" [Motor-vehicle wheel bearing arrangements]. The bearing arrangement and the joint bell are generally braced against one another and are secured together by a screw connection. The primary task of the screw connection is to hold the bearing inner races together, particularly during cornering, and to fix the joint axially against the bearing.

The wheel bearing arrangement in German Patent 2,542,917 is capable of being fitted with ABS. Its pulse ring is integrated as a metallic insert into the bearing seal. German Patent 4,134,434 proposes to design the pulse generator as axial toothing on the wheel bearing carrier. Moreover, German Offenlegungsschrift 3,126,192 discloses a bearing unit in which the joint bell is manufactured from fiber reinforced plastic. However, a bearing unit of this kind is not suitable for the transmission of high power.

To decouple and damp vibrations from the drive shafts, the joint bell and the wheel bearing arrangement are usually screwed together axially. The disadvantages of the screw connection are that it is complex and expensive in its manufacture and assembly, the connection is heavy and there are risks of the formation of fretting corrosion or wear and of corrosion between the bearing arrangement and the joint bell.

SUMMARY OF THE INVENTION

It is an object of the present invention to further develop a wheel bearing unit of the type herein described such that a compact, reliable, low vibration and light weight unit is formed from a small number of components and also to permit a construction which is advantageous in its manufacture and assembly.

The object is achieved by the features now described. The connecting part is fastened positively to the joint bell and the bearing arrangement on the wheel flange. This positive connection can be made using projections on the connecting element which stop at the grooves in the bearing arrangement and/or the joint bell. The connecting element may also serve as a sealing element, a damping element, a slinger disk and/or signal generator. Embedded magnetic or ferromagnetic material in the connecting element may serve as the signal generator. The connecting element is preferably of T-shaped cross section including a leg that extends between the bearing element of the wheel flange and the bell on the hub. The connecting element is preferably of plastic material or of elastic design.

The connecting element between the bearing arrangement and the joint bell is a T-shaped seal, which not only prevents the penetration of dirt and water and hence the formation of rust, but simultaneously serves as an axial retaining, fixing and damping means without involving expensive manufacture and assembly. It can, in addition, also assume the function of signal generation in the radial or axial direction.

An elastic recess or an axial spring element can be provided in the region of contact between the joint bell and the bearing arrangement in order to achieve freedom from play.

Other objects and features of the present invention are explained with reference to an exemplary embodiment and will become apparent from the following description of the invention which refers to the accompanying drawings.

DETAILED DESCRIPTION OF THE INVENTION

Figure 1:
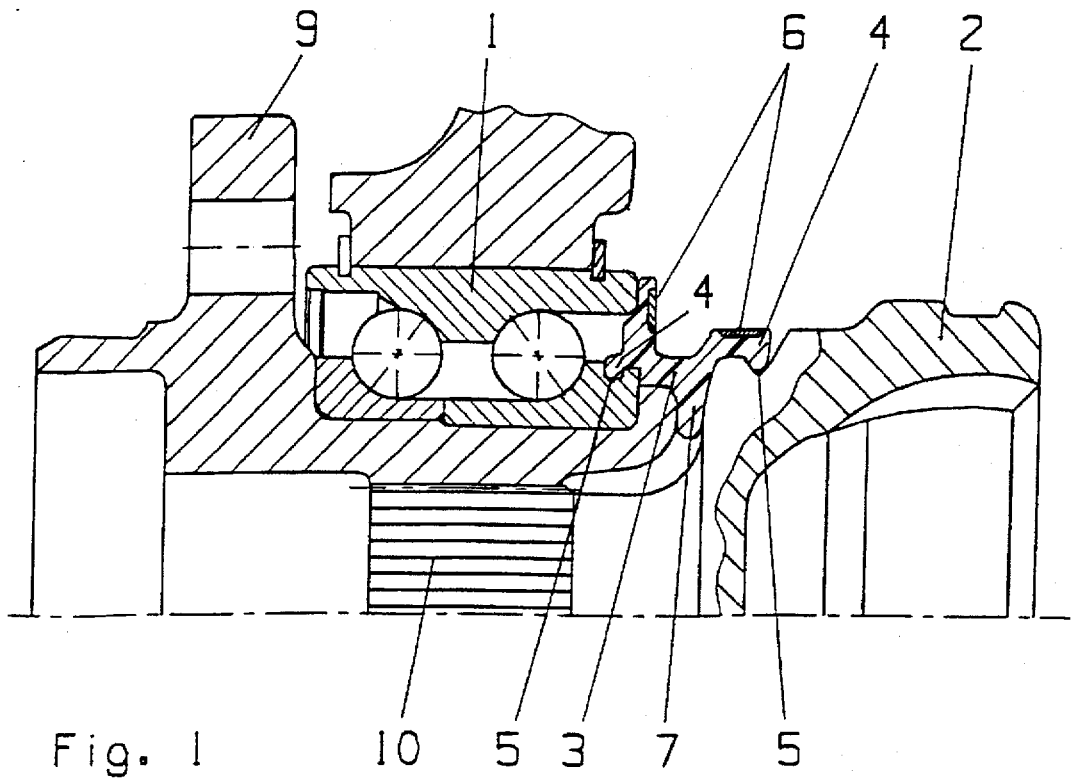
FIG. 1 shows a wheel bearing unit according to the invention, in partial cross section.

In FIG. 1 a bearing arrangement 1 cooperates with a joint bell 2. The joint bell can be designed either as a fixed or a mobile joint. A connecting element 3 is arranged between the bearing arrangement and the joint bell. The element 3 is fastened to the bearing 1 and to the joint bell 2 by means of projections 4 which snap into grooves 5 preformed in the bearing and the bell. For signal generation, e.g. for detecting the wheel speed, the connecting element 3 is provided with embedded magnetic or ferromagnetic elements 6 which extend radially or axially. It is also possible for a ferromagnetic ring or flange with gaps to be provided instead of the embedded elements.

Figure 2:
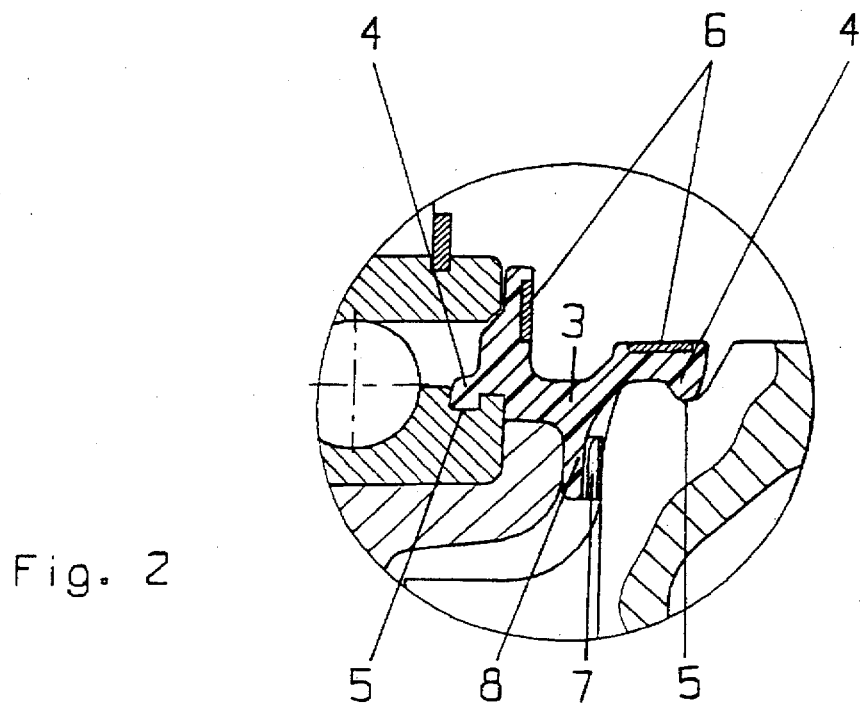
FIG. 2 is an enlarged detail showing the connecting element.

As can be seen from FIG. 2, the connecting element 3 extends radially inward in the region between the bearing arrangement and the joint bell where the element 3 forms an elastic projection 7. To achieve freedom from play, the projection is provided after assembly with elastic recesses or it has an axial spring 8.

To transmit torque to the vehicle wheel, the joint bell 2 and the wheel flange 9 are provided with radial toothing 10. The inner races of the bearing arrangement 1 are connected rigidly and permanently to the wheel hub 9 by a positive connection produced by roll riveting.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A wheel bearing unit for a drive wheel of a motor vehicle comprising:

a wheel flange;

a bearing arrangement comprising an inner race supported around the wheel flange, bearing rolling elements supported on the inner race, and an outer race around the inner race;

a hub supported to the wheel flange;

a joint bell for transmitting driving torque between the inner rotating race of the bearing and the wheel hub; and a connecting element positively fastening the joint bell to the bearing arrangement, the connecting element being arranged circumferentially, and between the bearing arrangement and the joint bell, so as to couple the bearing arrangement to the joint bell; the connecting element being of approximately generally T-shaped cross section having arms extending axially between the beating unit and the bell and including a post portion that projects radially inwardly to extend between the wheel flange and the hub.

2. The wheel bearing unit of claim 1, further comprising the connecting element having a circumference with projections thereon, grooves defined in the bearing arrangement and the joint bell, and the projections on the connecting element snap into the grooves of the bearing arrangement or the joint bell.

3. The wheel bearing unit of claim 1, wherein the connecting element is shaped and positioned to serve also as at least one of a sealing element, a damping element, a slinger disk, and a signal generator.

4. The wheel bearing unit of claim 1, further comprising a sensor for detecting the wheel rotation speed, the sensor responding to signal generation; and magnetic or ferromagnetic elements being embedded in the connecting element for providing the signal generation as the connecting element rotates.

5. The wheel bearing unit of claim 1, wherein the embedded elements are arranged axially on the connecting element.

6. The wheel bearing unit of claim 5, wherein the connecting element has an axial spring therein for affording elasticity to the connecting element.

7. The wheel bearing unit of claim 1, wherein the embedded elements are arranged radially on the connecting element.

8. The wheel bearing unit of claim 1, wherein the connecting element is comprised of a damping part made of plastic or composite.

9. The wheel bearing unit of claim 1, wherein the connecting element is of elastic design.

10. The wheel bearing unit of claim 1, wherein the connecting element has recesses therein giving it elasticity.

* * * * *